United States Patent [19]

Ikemoto

[11] Patent Number: 5,690,542
[45] Date of Patent: Nov. 25, 1997

[54] DISC STREAK PATTERN FORMING METHOD AND APPARATUS

[75] Inventor: Kiyoshi Ikemoto, Ayase, Japan

[73] Assignee: Speedfam Co., Ltd., Ayase, Japan

[21] Appl. No.: 703,104

[22] Filed: Aug. 26, 1996

[30] Foreign Application Priority Data

Apr. 15, 1996 [JP] Japan .................. 8-115294

[51] Int. Cl.$^6$ ...................................... B24B 1/00
[52] U.S. Cl. ............... 451/63; 451/271; 451/291; 451/431; 451/268
[58] Field of Search ............... 451/63, 270, 271, 451/278, 294, 211, 291, 431, 441, 268

[56] References Cited

U.S. PATENT DOCUMENTS

| | | | |
|---|---|---|---|
| 3,813,828 | 6/1974 | Bennett ........................... | 451/291 |
| 4,393,628 | 7/1983 | Ottman et al. ..................... | 451/63 |
| 5,167,096 | 12/1992 | Eltoukhy et al. .................. | 451/63 |
| 5,259,144 | 11/1993 | Yeh .................................. | 451/271 |

FOREIGN PATENT DOCUMENTS

| | | | |
|---|---|---|---|
| 3633008449 | 12/1988 | Japan ........................... | 451/63 |
| 1-306167 | 12/1989 | Japan . | |
| 2-199617 | 8/1990 | Japan . | |
| 5-303740 | 11/1993 | Japan . | |

OTHER PUBLICATIONS

IBM Technical Disclosure Bulletin–Disk Substrate Polisher–vol. 26 No. 3B, Aug. 1983.

*Primary Examiner*—Robert A. Rose
*Assistant Examiner*—George Nguyen
*Attorney, Agent, or Firm*—Fitch, Even, Tabin & Flannery

[57] ABSTRACT

A disc streak pattern forming method and apparatus are provided which are capable of not only forming fine streak patterns on a disc in a single step, but also arbitrarily adjusting an angle of intersection of streak patterns in a precise manner to thereby reduce the cost of production facilities and the cost of manufacture as well as to improve the magnetic property and the finishing accuracy of the disc. The disc streak pattern forming apparatus is equipped with a drum 2, a pad rotating member 3, a first motor 5 and a second motor 6. Polishing pads 4 mounted on the pad rotating member 3 are placed in sliding contact with the disc in the form of a magnetic disc 200 with an information storage surface 201 thereof being disposed within a central bore 40 in each polishing pad 4. Thereafter, the drum 2 and the pad rotating member 3 are driven to rotate by means of the first and second motors 5, 6 so that the polishing pads 4 are caused to revolve around the center of the drum 2 while rotating on their own axes, respectively, thus forming desired streak patterns on the magnetic disc 200.

8 Claims, 9 Drawing Sheets

DISC STREAK PATTERN FORMING METHOD AND APPARATUS

BACKGROUND OF THE INVENTION

1. Field of the Invention

The present invention relates to a method and an apparatus for forming streak patterns on a disc in which streak patterns having a predetermined angle of intersection are formed on the disc such as a magnetic disc or the like.

2. Description of the Prior Art

In recent years, the capacity of a magnetic disc increases at a high rate, and in the near future, it is expected that a magnetic disc will have a capacity capable of storing information of several giga bites.

Figure 10:
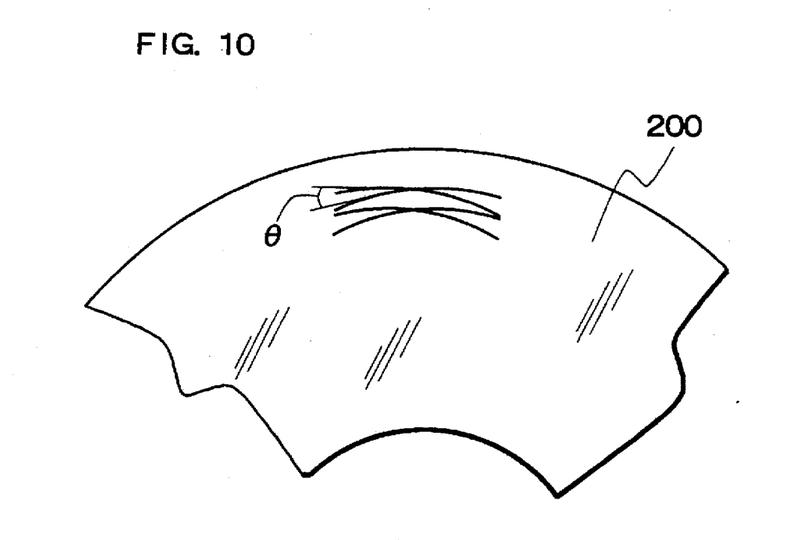
FIG. 10 is a schematic plan showing the angle of crossing or intersection of the streak patterns.

With such a magnetic disc having a great capacity and a high density, in order to enhance its magnetic property, it is desirous to provide a surface of the disc with streak patterns having an angle of crossing or intersection ranging from 20 degrees to 30 degrees, as clearly illustrated in FIG. 10.

Figure 11A:
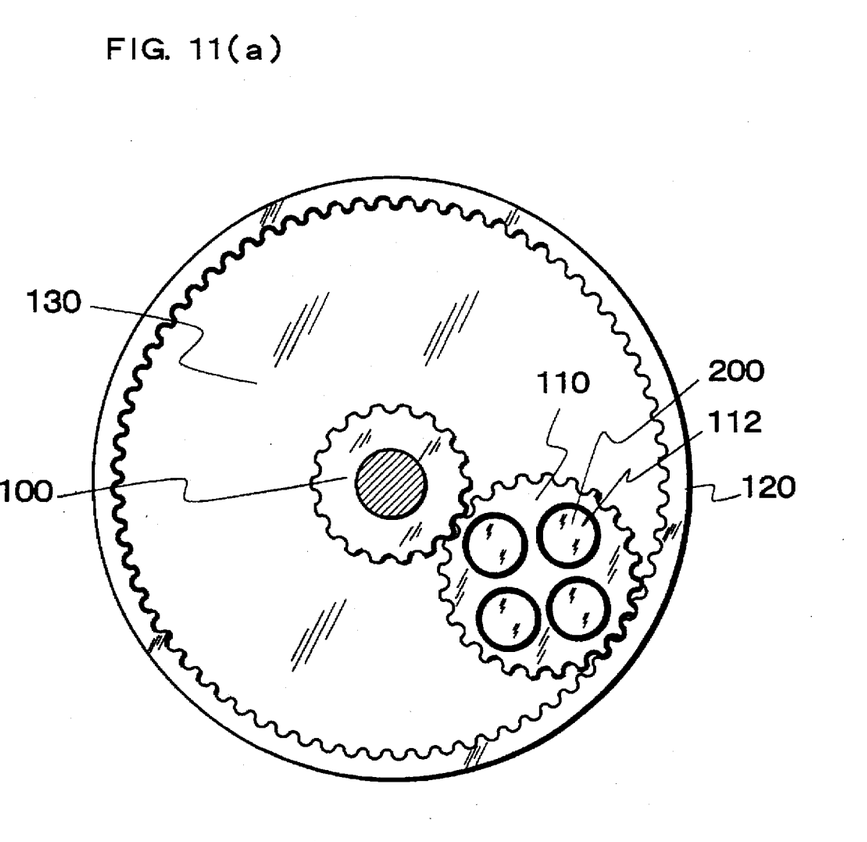
Figure 11B:
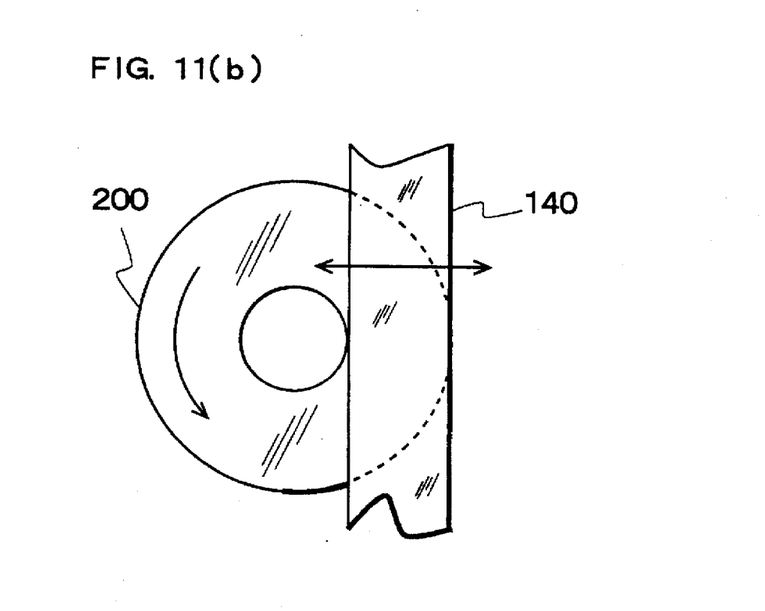

A known streak pattern forming technology for a magnetic disc of this kind is illustrated in FIGS. 11(a) and 11(b). FIG. 11(a) is a schematic plan view showing a polishing step, and FIG. 11(b) is a schematic view showing a texturing step in which streak patterns are formed on a surface of a magnetic disc after being subjected to a polishing process.

Specifically, in the polishing step of FIG. 11(a), a magnetic disc 200 having a undercoat or basic layer formed on a surface of a substrate is inserted into a work holding bore 112 in a carrier 110. Then, the magnetic disc 200 is clamped vertically by means of an upper clamp and a lower clamp (not illustrated) with the carrier 110 being engaged with a sun gear 100 and with an internal gear 120 for revolution around the sun gear 100 as well as for rotation on its own axis. At the same time, the upper clamp and the lower clamp 130 are caused to rotate in the opposite directions with respect to each other to thereby polish the magnetic disc 200. With this polishing process, the underlayer of the magnetic disc 200 is polished to a substantially complete flat surface having a roughness of 10 Å.

After the magnetic disc 200 has been polished in this manner, it is transferred to a texturing process.

In this texturing process, a tape 140 is made in contact at its abrasive grain surface with the flattened surface of the magnetic disc 200 and reciprocatively moved in a radial direction of the magnetic disc 200 while the magnetic disc 200 is being rotated.

As a result, as shown in FIG. 10, streak patterns with a crossing or intersecting angle in the range of from 20 degrees to 30 degrees are formed on the flat polished and abraded surface of the magnetic disc 120.

However, the above-described known streak pattern forming technique involves the following problems.

First, many process steps such as polishing, cleaning and texturing steps and the like are required until satisfactory streak patterns have been formed, as shown in FIG. 10, so that the entire process steps take a relatively long time, and facilities for fabrication as well as the cost of manufacture become high.

Moreover, since in the texturing step, the magnetic disc 200 is abraded or ground by means of the tape 140 having fixed abrasive grains, burrs, warpage and the like of several angstroms are formed on the surface of the magnetic disc 200, as a consequence of which the magnetic property thereof is not so enhanced and the accuracy of finishing is considerably low.

SUMMARY OF THE INVENTION

Accordingly, the present invention is intended to solve the above-described problems and has for its object to provide a disc streak pattern forming method and apparatus which can form fine streak patterns with a single process step, and in which the angle of crossing or intersection of the streak patterns can be arbitrarily adjusted in a precise manner, thereby reducing the cost of production facilities and the cost of manufacture as well as enhancing the magnetic property and the finishing accuracy of the polished disc.

In order to achieve the above object, in accordance with one aspect of the present invention, there is provided a disc streak pattern forming method for use in polishing a disc having a surface and a center, the method comprising the steps of:

providing a ring-shaped polishing means having a central axis and defining a central bore therein;

placing the ring-shaped polishing means in contact with the surface of the disc, with at least one portion of the surface disposed inside the central bore of the ring-shaped polishing means;

driving the ring-shaped polishing means to revolve about the center of the disc; and driving the ring-shaped polishing means to rotate around its central axis, whereby the surface of the disc is polished and provided with streak patterns by the ring-shaped polishing means.

In a preferred form of the method, the surface of the disc is annular and has an annular band area with a radially outer periphery and a radially inner periphery defining a radial width therebetween, and the central bore of the ring-shaped polishing means has a diameter equal to or greater than the radial width of the annular band area of the ring-shaped polishing means.

In another preferred form of the method, the surface of the disc is annular and has a radially outer periphery and a radially inner periphery, and the ring-shaped polishing means comprises at least one ring-shaped polishing pad, the at least one ring-shaped polishing pad being disposed in such a manner that the radially outer periphery and the radially inner periphery of the at least one portion of the surface of the disc are both disposed inside the central bore of the at least one ring-shaped polishing pad.

In a further preferred form of the method, the surface of the disc is annular and has a radially outer periphery and a radially inner periphery, and the ring-shaped polishing means comprises a plurality of ring-shaped polishing pads, and the method further comprising the steps of:

disposing the plurality of ring-shaped polishing pads about the center of the disc in such a manner that the radially outer periphery and the radially inner periphery of the at least one portion of the surface of the disc are both disposed inside the central bore of each of the ring-shaped polishing pads; and subjecting the respective ring-shaped polishing pads to the contacting, revolving and self-rotating steps.

In accordance with another aspect of the invention, there is provided a disc streak pattern forming apparatus for use in polishing a disc having a surface and a center, the apparatus comprising:

ring-shaped polishing means having a central axis, a central bore and a working surface in contact with the disc; and a drive unit supporting thereon the ring-shaped polishing means in such a manner that at least a portion of the surface of the disc is disposed inside the central bore of the ring-shaped polishing means, the drive unit being operable to revolve the ring-shaped polishing means around the center of the disc and rotate the ring-shaped polishing means about its central axis while maintaining contact with the surface of the disc, thereby polishing the surface of the disc and forming streak patterns thereon.

In a preferred form of the apparatus, the drive unit comprises:

revolving means having a center and capable of revolving around the center of the disc;

self-rotating means mounted on the revolving means for rotation relative thereto; and driving means for driving the revolving means to revolve around the center of the disc and for driving the self-rotating means to rotate the ring-shaped polishing means about its central axis while maintaining contact with the surface of the disc, so as to polish the surface of the disc and form streak patterns thereon.

In another preferred form of the apparatus, the surface of the disc is annular and has an annular band area with a radially outer periphery and a radially inner periphery defining a radial width therebetween, and the central bore of the ring-shaped polishing means has a diameter equal to or greater than the radial width of the annular band area of the ring-shaped polishing means.

In a further preferred form of the apparatus, the surface of the disc is annular and has a radially outer periphery and a radially inner periphery, and the ring-shaped polishing means comprises at least one ring-shaped polishing pad, the at least one ring-shaped polishing pad being disposed in such a manner that the radially outer periphery and the radially inner periphery of the at least one portion of the surface of the disc are both disposed inside the central bore of the at least one ring-shaped polishing pad.

In a further preferred form of the apparatus, the surface of the disc is annular and has a radially outer periphery and a radially inner periphery, and the ring-shaped polishing means comprises a plurality of ring-shaped polishing pads disposed about the center of the disc in such a manner that the radially outer periphery and the radially inner periphery of the at least one portion of the surface of the disc are both disposed inside the central bore of each of the ring-shaped polishing pads.

In a further preferred form of the apparatus, the revolving means has a teethed portion formed on its outer periphery; and the self-rotating means comprises a shaft member rotatably supported on the revolving means, a mounting member mounted on one end of the shaft member and having one end extended from the revolving means, the ring-shaped polishing means attached to the extended end of the mounting member, and a driven gear wheel mounted on the other end of the shaft member; and the driving means comprises a first motor having a first drive gear wheel in meshing engagement with the teethed portion of the revolving means for driving the revolving means through the meshing engagement of the first drive gear wheel and the teethed portion, and a second motor having a second drive gear wheel in meshing engagement with the driven gear wheel of the self-rotating means for driving the self-rotating means through the meshing engagement of the second drive gear wheel and the driven gear wheel.

In accordance with a further aspect of the invention, there is provided a disc streak pattern forming method for use in polishing a disc of a predetermined size and having a surface and a center, the method comprising the steps of:

providing a plurality of ring-shaped polishing means each having a central axis and each defining a central bore;

placing the plurality of ring-shaped polishing means in contact with the surface of the disc, with spaced-apart portions of the disc surface disposed inside the central bores of the ring-shaped polishing means;

driving the plurality of ring-shaped polishing means to travel about the center of the disc; and driving the plurality of ring-shaped polishing means to rotate about their own respective central axes while maintaining contact with the disc surface so as to form a disc streak pattern on the disc surface.

BRIEF DESCRIPTION OF THE DRAWINGS

FIGS. 11(a) and 11(b) are schematic plan views showing a conventional technique for forming streak patterns on a magnetic disc, in which FIG. 11(a) illustrates a polishing step thereof, and FIG. 11(b) illustrates a texturing step thereof.

DESCRIPTION OF THE PREFERRED EMBODIMENTS

In the following, preferred embodiments of the present invention will be described in detail with reference to the accompanying drawings.

Figure 1:
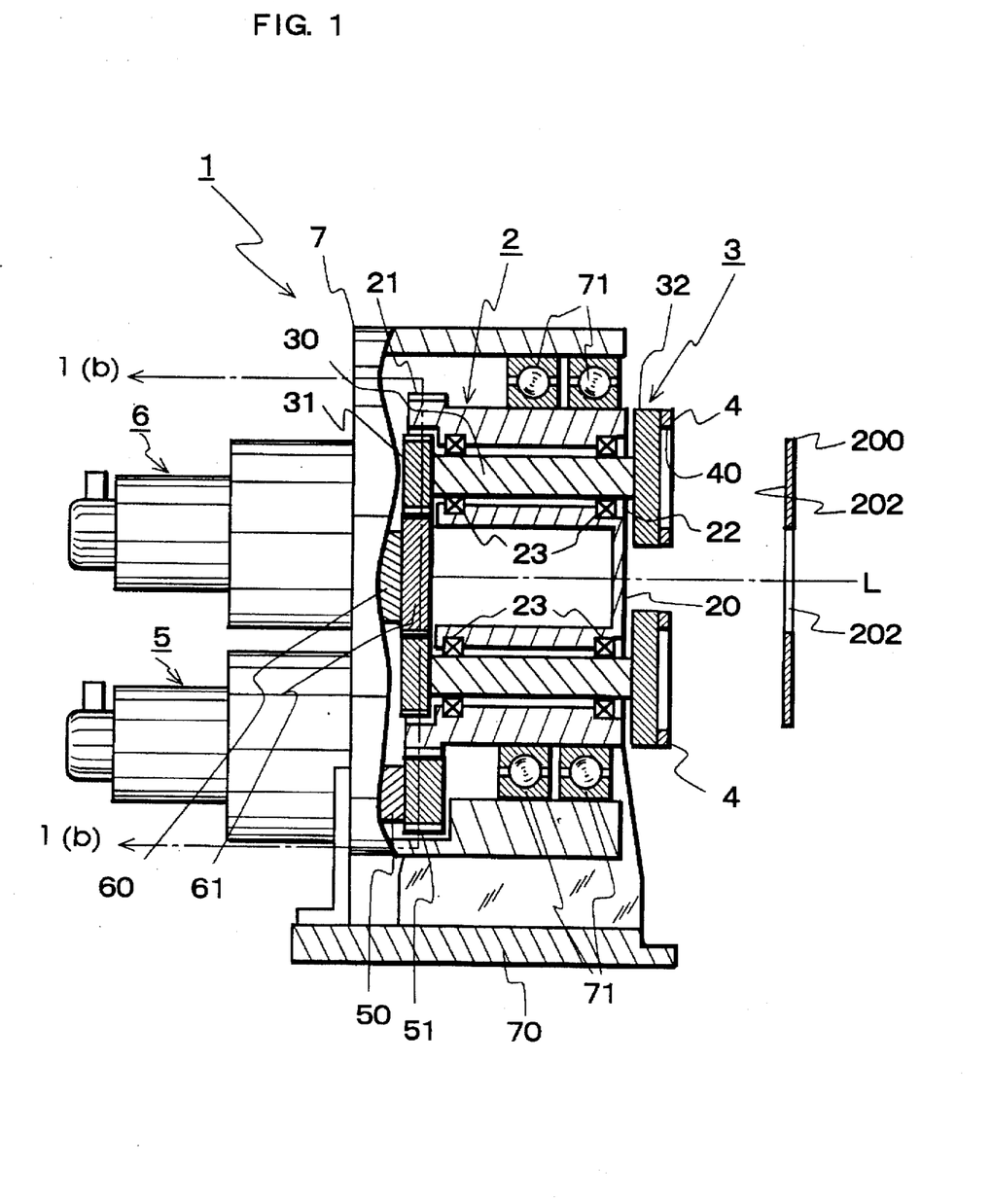
FIG. 1 is a side elevational view, partially cut-away along a line A—A of FIG. 1(a), of a streak pattern forming apparatus for a disc according to one embodiment of the present invention.

Referring to the accompanying drawings and first to FIG. 1, there is shown a disc streak pattern forming apparatus constructed in accordance with the principles of the present invention.

Figure 1A:
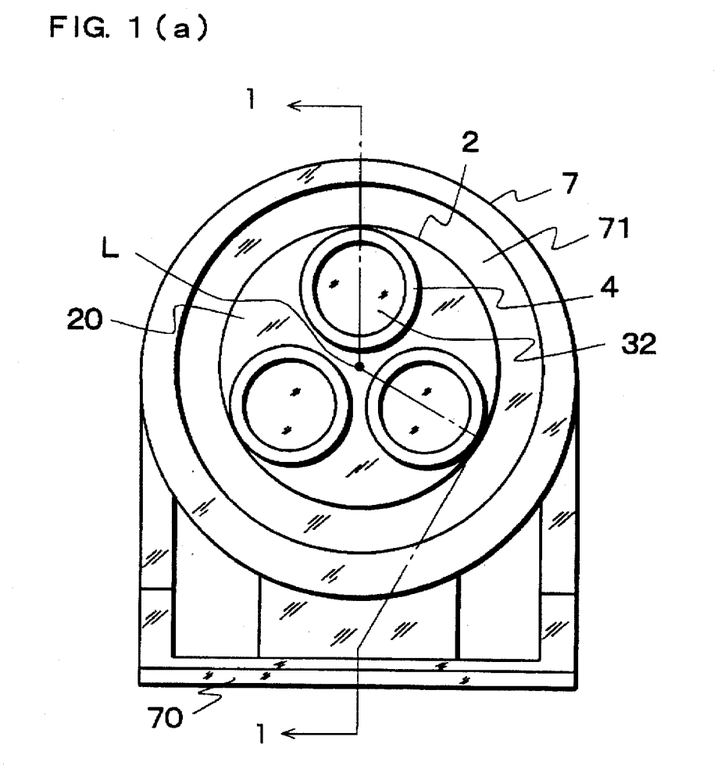
FIG. 1(a) is a front elevational view thereof.

As illustrated in FIGS. 1 and 1(a), a streak pattern forming apparatus 1 of the present invention includes a revolving means in the form of a drum 2, a self-rotating means comprising, in the illustrated embodiment, three pad rotating members 3, and a driving means comprising a first motor 5 for driving the drum 2 and a second motor 6 for driving the pad rotating member 3.

The drum 2 takes the shape of a cylinder having a disc-shaped mounting surface 20 attached to one end thereof (i.e., the right-hand end in the illustrated embodiment in FIG. 1), and it is supported by a housing 7 for rotation relative thereto.

Specifically, the drum 2 is disposed in the housing 7 fixedly mounted on a base 70. A plurality of bearings 71 are disposed between the outer surface of the drum 2 and the inner surface of the housing 7 so that the drum 2 can rotate around its central axis L. The drum 2 is provided at its outer surface with a teethed portion 21.

The three pad rotating members 3 are mounted on the drum 2 for rotation relative thereto.

Each of the pad rotating members 3 is comprised of a shaft member 30, a gear wheel 31 and a pad mounting portion 32. More specifically, the shaft member 30 is inserted into the drum 2 through a bore 22 formed through a mounting surface 20 of the drum 2, and it is rotatably supported by a plurality of bearings 23. The gear wheel 31 is fixedly attached to a rear end (i.e., the left-hand end in FIG. 1) of the shaft member 30. The pad mounting portion 32 is firmly secured to a distal end (i.e., the right-hand end in FIG. 1) of the shaft member 30 which protrudes from the mounting surface 20.

The pad mounting portion 32 is in the form of a disc member having a ring-shaped polishing pad 4 attached to its one side surface.

Figure 2:
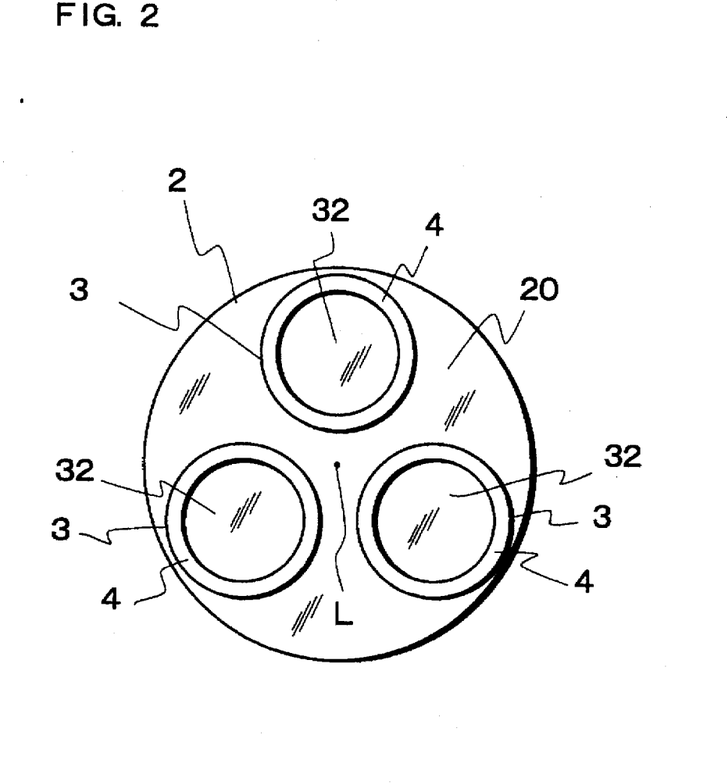
FIG. 2 is a front elevational view showing an arrangement of three pad rotating members.

As clearly shown in FIG. 2, the three pad rotating members 3 are symmetrically disposed around the central axis L of the drum 2 and circumferentially spaced apart from each other at the same intervals of 120 degrees. With such a disposition, the three polishing pads 4 fixedly attached to the distal end surface of the pad mounting portion 32 are similarly disposed in a symmetrical relation (i.e., a rotational symmetry) with respect to each other at the same circumferential intervals of 120 degrees.

Each of the polishing pads 4 is formed of a polishing cloth of polyurethane such as, for example, a POLITEX PAD sold by RODEL NITTA Co., Ltd.

For example, in a case where a 5-inch type magnetic disc 200 having an outer diameter of 130 mm and an inner diameter of 40 mm is to be polished, the polishing pad 4 is sized such that its outer and inner diameters are 65 mm and 45 mm, respectively, and for a 3.5-inch type magnetic disc 200 having an outer diameter of 95 mm and an inner diameter of 25 mm, the outer and inner diameters of the polishing pad 4 are set to be 50 mm and 35 mm, respectively.

Here, it is to be noted that the term "information storage surface" as used throughout the description is defined as a surface of the magnetic disc 200 on which information is to be written or stored. In other words, the information storage surface 201 in this embodiment is the entire annular surface of the magnetic disc 200. In this embodiment, it is contemplated that the magnetic disc 200 with its entire surface being an information storage surface is to be polished.

Figure 3:
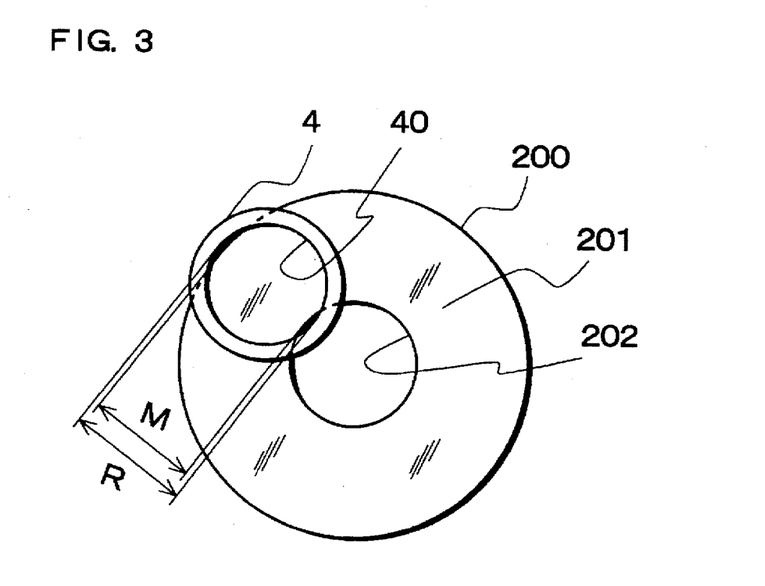
FIG. 3 is a schematic view showing how to set the internal diameter of a polishing pad.

As shown in FIG. 3, the internal diameter of each of the ring-shaped polishing pads 4 is suitably set in relation to the magnetic disc 200. That is, the internal diameter R of each polishing pad 4 is set such that it is equal to or greater than the width M of an information storing surface 201 of the magnetic disc 200.

The drum 2 and the pad rotating member 3 as constructed above are caused to rotate by means of the first and second motors 5, 6, as seen from FIG. 1.

The first motor 5 is mounted on a lower back portion of the housing 7 with its rotation shaft 50 being inserted in the housing 7. A gear wheel 51 is fixedly secured to a distal end of the rotation shaft 50 and placed in meshing engagement with the teethed portion 21 of the drum 2, as clearly illustrated in FIG. 1(b).

On the other hand, the second motor 6 is mounted on an upper back portion of the housing 7 with its rotation shaft 60 being inserted into the housing 7. Fixedly secured to a distal end of the rotation shaft 60 is a gear wheel 61 which is disposed at the center of the drum 2 and placed in meshing engagement with the gear wheels 31 of the three pad rotating members 3, as also explicitly illustrated in FIG. 1(b).

Figure 1B:
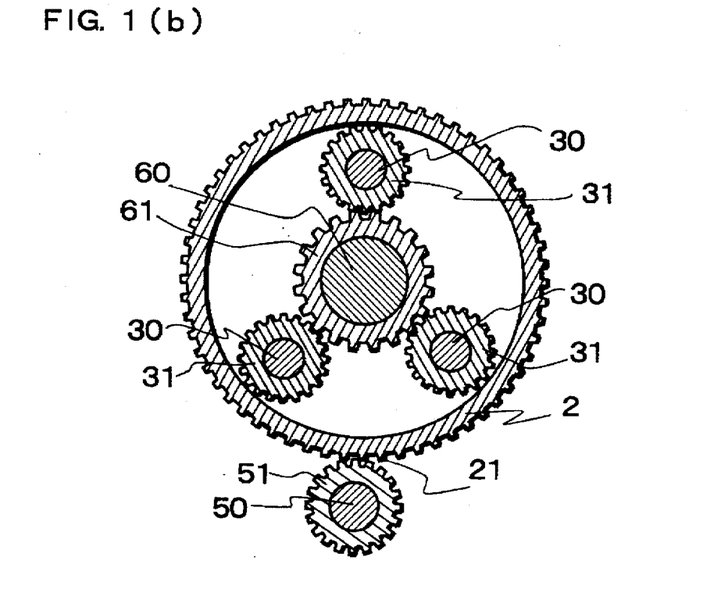
FIG. 1(b) is a cross sectional view thereof taken along a line B—B of FIG. 1.

With this arrangement, when the first motor 5 is energized to drive the drum 2 to rotate, the three pad rotating members 3 are also caused to revolve around the central axis L of the drum 2 integrally with the rotation of the latter. Then, the second motor 6 is energized to drive the three pad rotating members 3 to rotate on their own axes, respectively, thereby causing the respective polishing pads 4 to rotate around the central axis of the shaft member 3.

Figure 4:
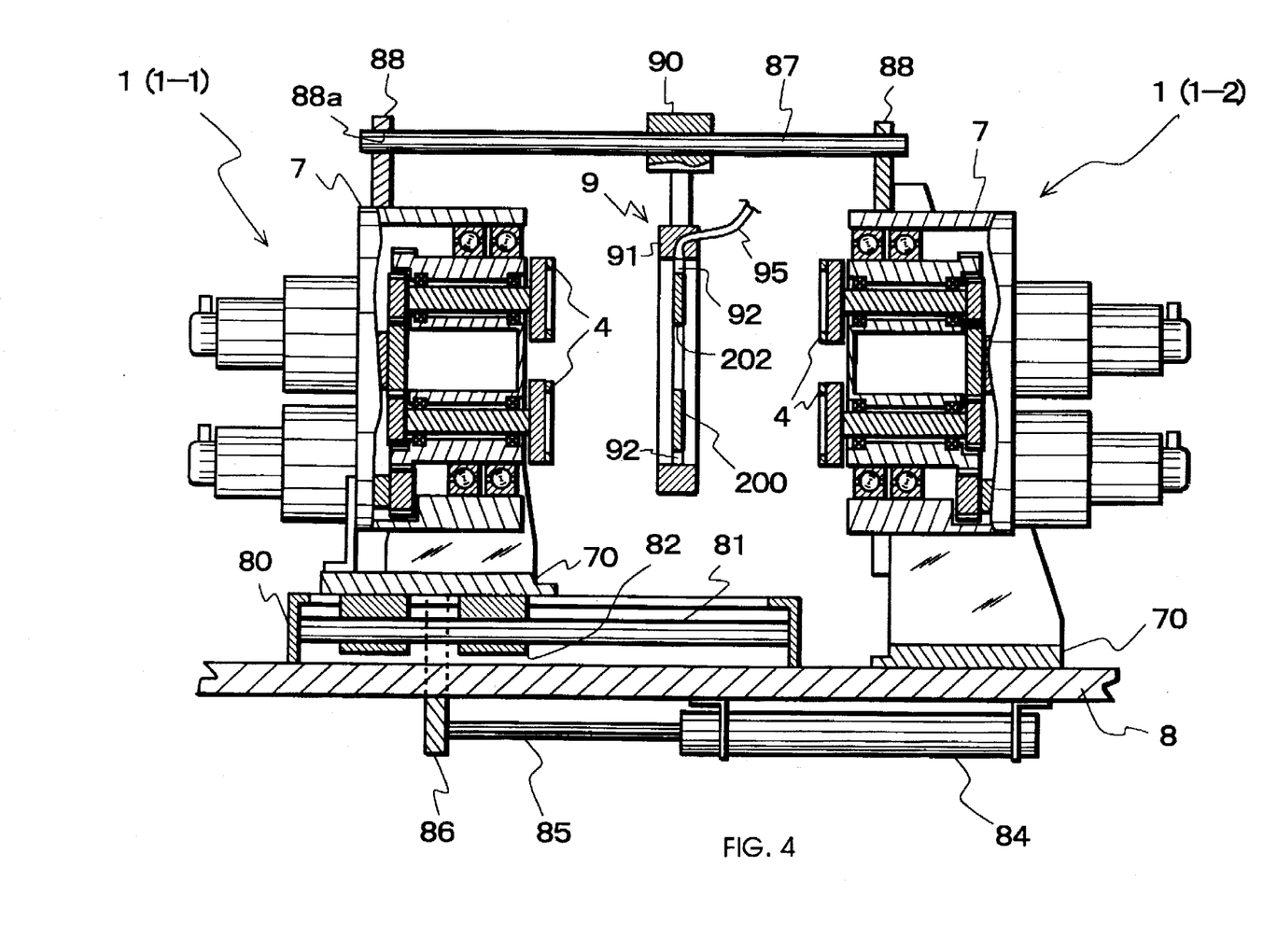
FIG. 4 is a partially cut-away side elevational view showing a streak pattern forming system to which a disc streak pattern forming apparatus according to the present invention is applied.

FIG. 4 is a partially broken-away side elevational view which shows a streak pattern forming system to which the streak pattern forming apparatus according to the first embodiment of the present invention is applied.

The streak pattern forming system is capable of forming streak patterns on the opposite side surfaces of a magnetic disc 200, and it is constructed such that two streak pattern forming apparatuses 1 are mounted on a work bench 8 in an opposing relating with respect to each other with a holder 9 for holding the magnetic disc 200 being disposed therebetween.

A first one 1-1 of the streak pattern forming apparatuses 1 disposed on the left-hand side of FIG. 4 is movable to the right and left in FIG. 4. Specifically, a moving frame 80 having a rail 81 disposed therein is mounted on the work bench 8. The first streak pattern forming apparatus 1-1 is installed on the moving frame 80. A slider 82 provided beneath a pedestal 70 of the first streak pattern forming apparatus 1-1 is mounted on the rail 81 inside the moving frame 80 for sliding motion therealong. Mounted under the work bench 8 is a piston 84 having a piston rod 85 fixedly attached at its distal end to a coupling plate 86 firmly secured to the pedestal 70.

With this arrangement, the pedestal 70 of the first streak pattern forming apparatus 1-1 is connected with the piston 84 through the coupling plate 86, so that as the piston rod 85 of the piston 84 is driven to move in an expanding or contracting direction, the first streak pattern forming apparatus 1-1 is caused to move along the rail 81.

On the other hand, the other or a second one 1-2 of the streak pattern forming apparatuses 1 disposed on the left-hand side of FIG. 4 is fixedly mounted on the work bench 8 and has a housing 7 on the upper surface of which a support member 88 is vertically mounted for supporting one end of the rail 87. The other end of the rail 87 is extended through a bore 88a in the support member 88 standing from the upper surface of the housing 7 of the first streak pattern forming apparatus 1-1.

The holder 9 is supported by a slider 90 which is engaged with the rail 87 for free sliding movement therealong. Thus, the holder 9 is movable along the rail 87.

The holder 9 comprises an annular frame 91 and a plurality of (e.g., four in the illustrated example) clamps 92 movable toward and away from the center of the annular frame 91. Inserted into the top of the frame 91 is a hose 95 for dispensing a polishing liquid.

Figure 4A:
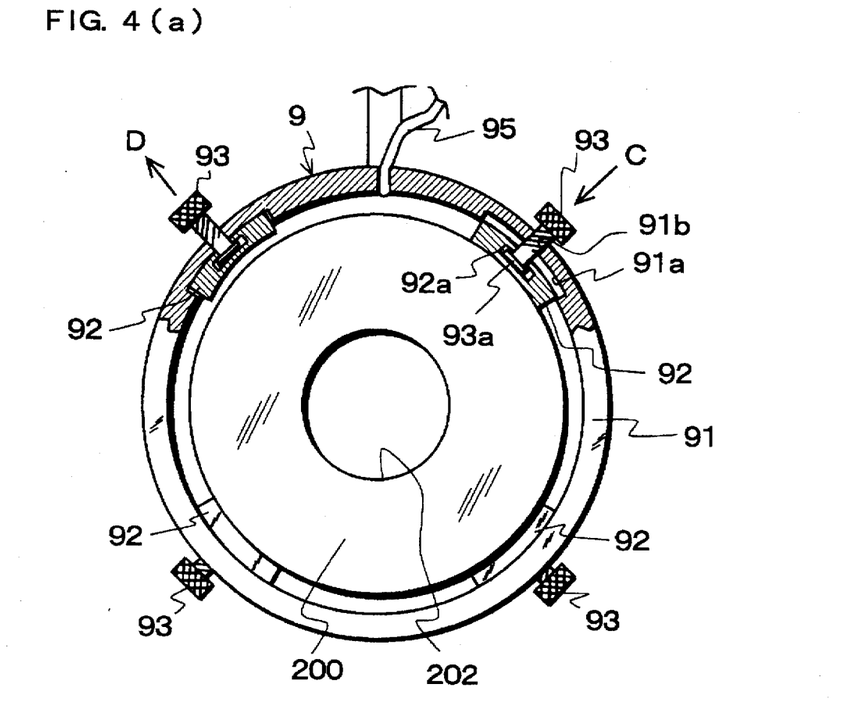
FIG. 4(a) is a partially cut-away front elevational view of a holder illustrated in FIG. 4.
Figure 5:
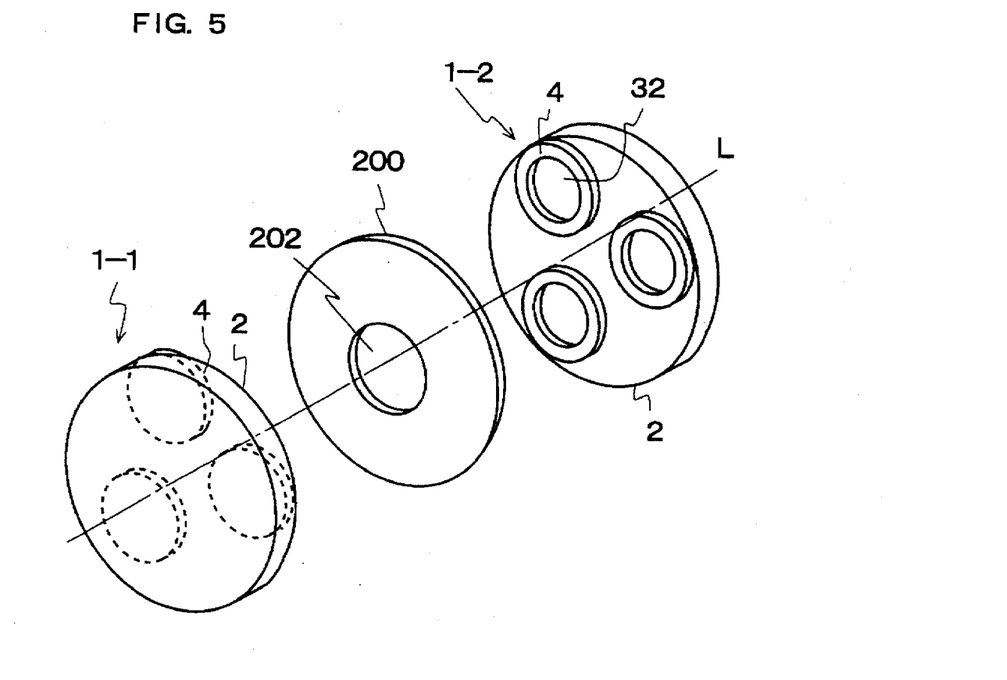
FIG. 5 is a schematic perspective view showing the coincidence of the central axis of a drum and the center of a magnetic disc.

As clearly seen from FIG. 4(a), the clamps 92 are mounted on the annular frame 91 at substantially equal circumferential intervals and respectively inserted into corresponding recesses 91a formed in the inner periphery of the frame 91 for radial movement relative thereto. A plurality of bolts 93 corresponding in number to the clamps 92 are screwed into threaded bores 91a in the frame 91 and each have an enlarged end 93a received in a hole 92a in a corresponding clamp 92 for free relative rotation.

With this arrangement, the magnetic disc 200 is placed inside the annular frame 91 and clamed at it peripheral portion by the clamper 92 so that it is thereby fixedly held inside the annular frame 91.

Specifically, as shown at the upper right-hand clamp 92 in FIG. 4(a), by screwing in a bolt 93 in a radially inner direction C, the distal or inner end of the bolt 93 is brought into contact with the bottom of a hole 92a in a corresponding clamp 92 to thereby urge the inner periphery of the clamp 92 into contact with the outer periphery of the magnetic disc 200. Thus, the magnetic disc 200 is fixed in position by means of the holder 9.

On the other hand, as shown at the upper left-hand clamp 92 in FIG. 4(a), by screwing out a bolt 93 in a radially outer direction D, the corresponding clamp 92 is radially moved away from the outer periphery of the magnetic disc 200 so that the magnetic disc 200 can be released and taken out of the holder 9.

Now, the operation of the streak pattern forming apparatuses as constructed above will be described. In this regard, it is to be noted that the streak pattern forming apparatuses perform during its operation a streak pattern forming method of the present invention in the following manner.

First, in the system of FIG. 4, the magnetic disc 200 is placed inside the annular frame 91 and clamped at its peripheral portion by means of the clamper 92. Thus, the magnetic disc 200 is fixedly held inside the annular frame 91 and at the same time, the central axes L of the drums 2 of the pair of the streak pattern forming apparatuses 1-1, 1-2 are placed in alignment with the center of the magnetic disc 200.

With this state, the holder 9 is moved to the right in FIG. 4, i.e., in a direction toward the second streak pattern forming apparatus 1-2, so that the right-hand side surface of the magnetic disc 200 is placed in contact with the polishing pads 4 of the second streak pattern forming apparatus 1-2. Thereafter, the piston 84 is operated to contact the piston rod 85 to thereby move the first streak pattern forming apparatus 1-1 toward the holder 9, thus causing the polishing pads 4 in contact with the left-hand side surface of the magnetic disc 200.

Figure 6:
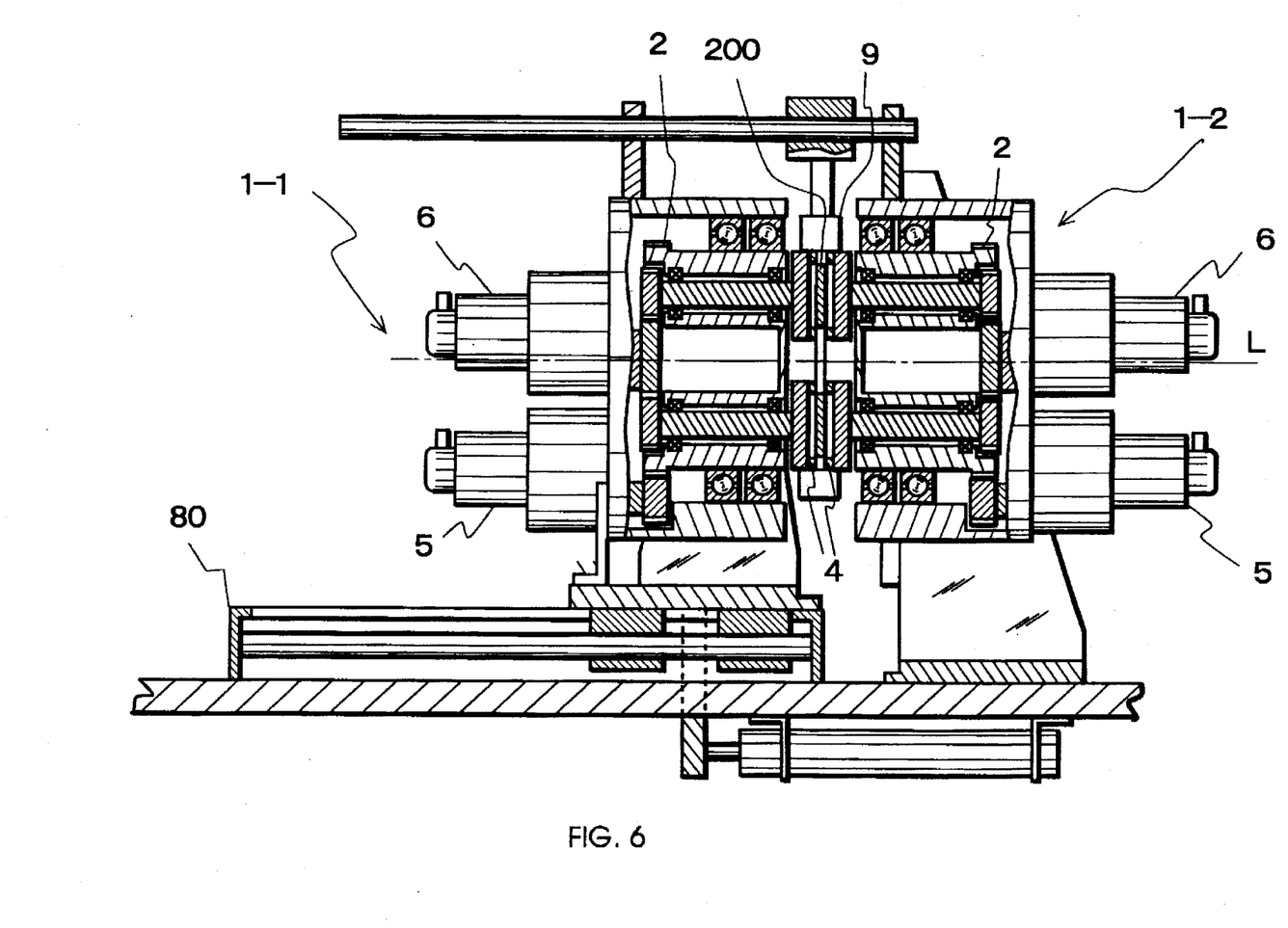
FIG. 6 is a side elevational view showing the state in which polishing pads of the streak pattern forming apparatus are placed in contact with the opposite surfaces of the magnetic disc.

That is, as shown in FIG. 6, the first streak pattern forming apparatus 1-1 is fixedly held on the moving frame 80 with the polishing pads 4 of the first and second streak pattern forming apparatuses 1-1, 1-2 being placed in contact with the opposite sides of the magnetic disc 200.

Accordingly, as illustrated in FIG. 3, the information storage surface 201 of the magnetic disc 200 is disposed inside the central bore 40 in each polishing pad 4 while being in sliding contact with the polishing pads 4 of the streak pattern forming apparatuses 1-1, 1-2 (a contacting step).

In this state, the first motor 5 for driving the first and second streak pattern forming apparatuses 1-1, 1-2 to revolve as shown in FIG. 6 is energized so that the respective drums 2 are driven to rotate, thereby causing the polishing pads 4 held in contact with the opposite sides of the magnetic disc 200 to revolve around the central axes L of the drums 2 (a revolving step).

Subsequently, when the second motor 6 for rotating the streak pattern forming apparatuses 1-1, 1-2 on their own axes is energized while supplying the unillustrated polishing liquid to the opposite sides of the magnetic disc 200, the six polishing pads 4 are thereby caused to rotate on their own axes, respectively (a self-rotating step).

In this manner, by means of the fine-grained surfaces of the polishing pads 4, the information storage surface of the magnetic disc 200 is polished to form streak patterns. That is, a polishing step is performed on the magnetic disc 200 by means of the polishing pads 4, and simultaneously with this polishing step, a texturing step is carried out in which the streak patterns having a crossing or intersecting angle as shown in FIG. 10 are formed on the information storage surface 201.

Here, the streak pattern forming operation in the above-mentioned texturing step will now be described in detail with reference to FIG. 7.

Figure 7:
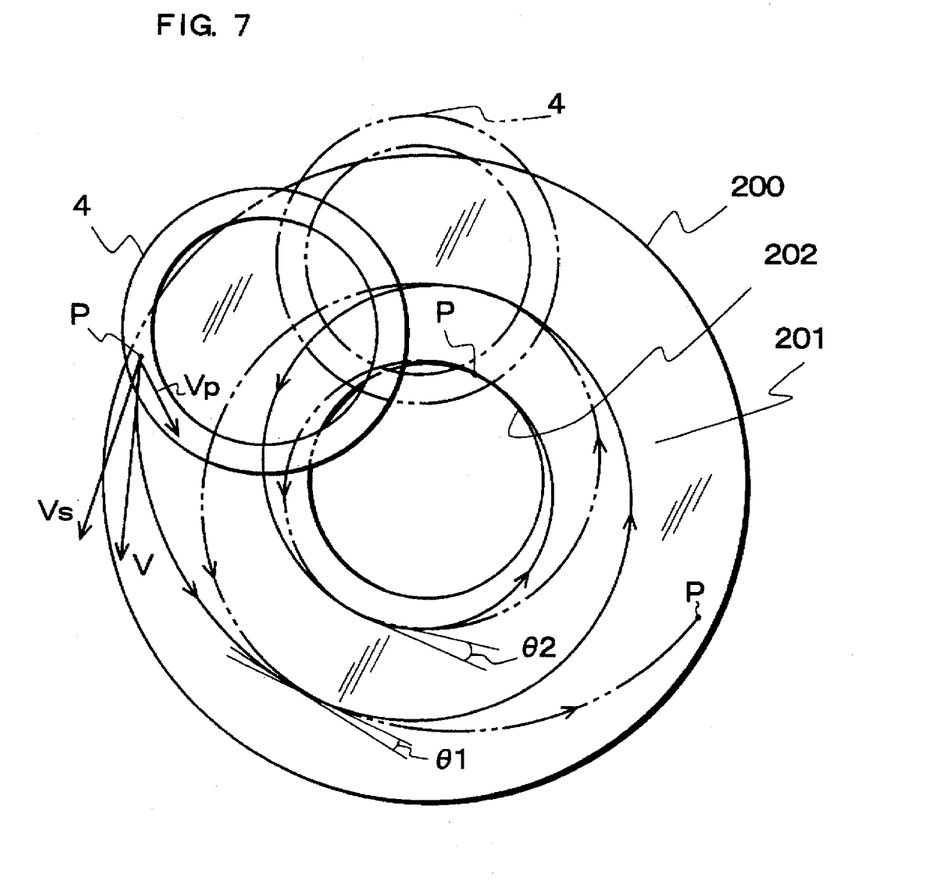
FIG. 7 is a schematic plan view showing the state of streak patterns formed on the magnetic disc.
Figure 8:
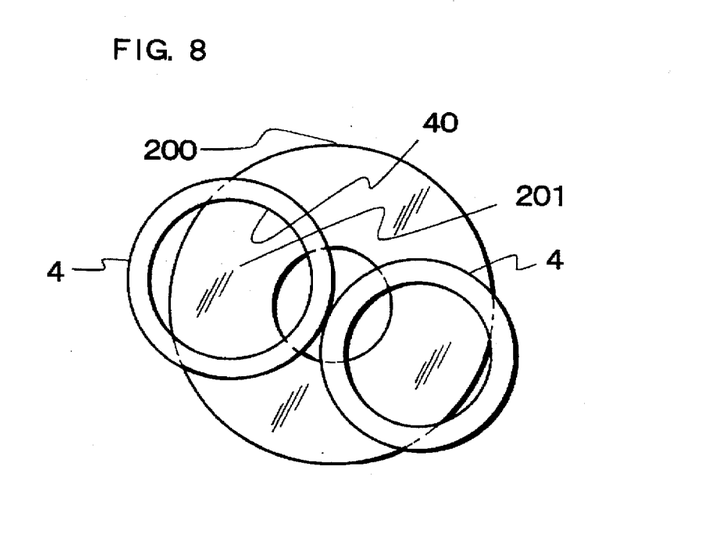
FIG. 8 is a schematic plan view of a modified form of the streak pattern forming apparatus according to the present invention.
Figure 9:
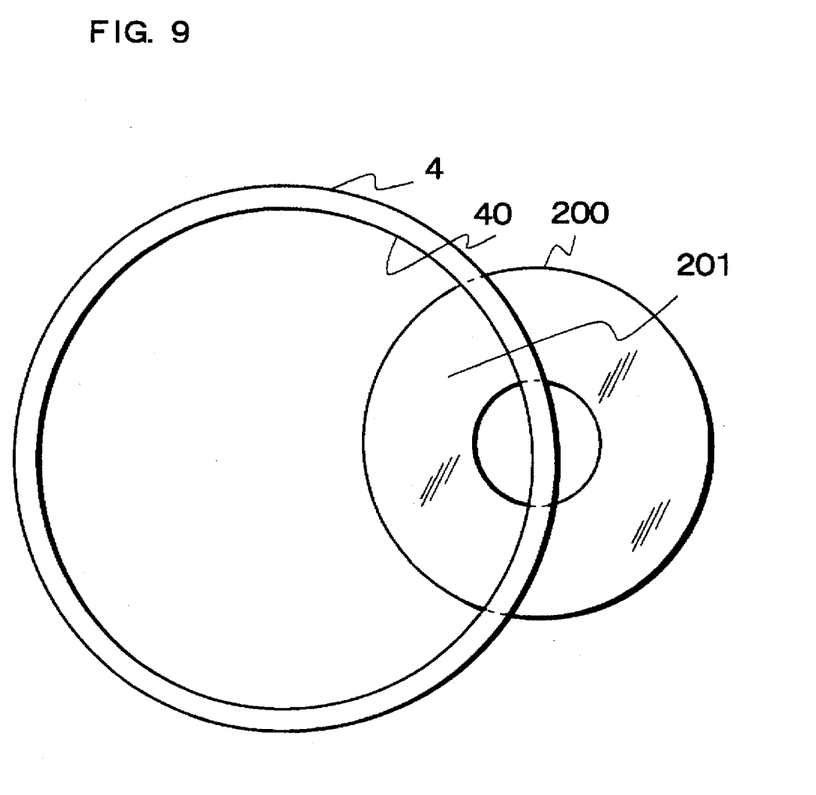
FIG. 9 is a schematic plan view of a further modified form of the present invention.

In FIG. 7, let us assume that one point of a polishing pad 4 be designated at P, as shown by the solid line. Then, the velocity vector V of the point P is equal to a composition or sum of a revolving velocity vector Vs of the polishing pad 4 and a self-rotating velocity vector Vp of the polishing pad 4.

For this reason, the point P located in the vicinity of the outer peripheral portion of the magnetic disc 200 moves to the central bore 202 in the magnetic disc 200 while drawing a spiral as shown by the solid line in FIG. 7.

The point P then comes again from the peripheral portion of the central bore 202 to the information storage surface 201 side to further proceed toward the outer periphery of the magnetic disc 200 while drawing a spiral as indicated by the two-dot chain line in FIG. 7.

Thus, assuming that the point P be a contact portion at which the annular polishing pad 4 contacts the information storage surface 201 of the magnetic disc 200, curved streaks having a plurality of crossing or intersecting points are formed on the information storage surface 201 by means of the contact portion. By all the contact portions of the polishing pads 4 contacting the information storage surface 201, a multitude of such streaks are formed, thereby providing a mesh-like streak patterns on the information storage surface 201.

In this case, since the polishing pads 4 are formed of a material such as cloth, fabric and the like, fine streak patterns having a center line average roughness of 10 Å or thereabound are provided on the information storage surface 201.

The magnitude of the revolving velocity vector Vs decreases as the point P moves in a direction from the outer periphery toward the central bore 202 in the magnetic disc 200. As a result, an angle of intersection $\theta 2$ at a point of intersection near the central bore 202 is larger than an angle of intersection $\theta 1$ at a point of intersection near the periphery of the magnetic disc 200, but an angle of intersection formed by intersecting streak patterns is determined by the angle of intersection $\theta 1$ thereof. Therefore the rotation speed of the second motor 6 is set in advance such that the angle of intersection $\theta 1$ is in the range of from 20 degrees to 30 degrees.

If the angle of intersection $\theta 1$ is outside the above range, the rotation speed of the second motor 6 is adjusted to vary the magnitude of self-rotating velocity vector Vp of the polishing pads 4. With this adjustment, the angle of intersection θ1 is varied in accordance with the magnitude of the self-rotating velocity vector Vp so that the rotation speed of the second motor 6 can be suitably adjusted to place the angle of intersection θ1 within the above range of from 20 degrees to 30 degrees.

Specifically, for example, streak patterns having an angle of intersection "20 degrees" can be formed with the following settings: the rotational speed of the second motor 6 is set such that the magnitude of the self-rotating velocity vector Vp of each polishing pad 4 is 6 m/min, and the rotational speed of the first motor 5 is set such that the magnitude of the revolving velocity vector Vs at a point P located on the outer periphery or circumference of the magnetic disc 200 is 70 m/min.

Furthermore, streak patterns with an angle of intersection "30 degrees" can be formed by setting the rotational speed of the second motor 6 in such a manner that the magnitude of the self-rotating velocity vector Vp is 12 m/min while retaining the above setting of the rotational speed of the first motor 5 with the same magnitude of the revolving velocity vector Vs. In other word, streak patterns with an angle of intersection θ1 ranging from 20 degrees to 30 degrees can be obtained by suitably setting the rotational speed of the second motor 6 in such a manner that the magnitude of the self-rotating velocity vector Vp is in the range of from 6 to 12 m/min, while maintaining or setting the rotational speed of the first motor 5 such that the magnitude of the revolving velocity vector Vs is 70 m/min.

In this manner, according to the streak pattern forming apparatuses of this embodiment, the rotating polishing pads 4 are placed in contact with the magnetic disc 200 to thereby form streak patterns on the information storage surface 201 thereof, so that there are provided fine streak patterns having a center line average roughness of about 10 Å. As a consequence, the magnetic property of the magnetic disc 200 can be improved and the polishing step and the texturing step can be concurrently carried out in a single step, thus serving to reduce the cost of production facilities as well as the cost of manufacture.

Moreover, by changing the rotation speed of the second motor 6 in an appropriate manner, the angle of intersection of streak patterns can be adjusted to a desired value, so that the finishing accuracy of the magnetic disc 200 can be enhanced.

Here, it is to be noted that the present invention is not limited to the above-described embodiment but instead various modifications and changes thereof can be made without departing from the spirit or scope of the claimed subject matter of the present invention.

For example, although in the above-described embodiment, three pad rotating members 3 are mounted on each drum 2, one, two, four or more pad rotating members 3 can be employed. In this case, however, the inner diameter of each ring-shaped polishing pad 4 has to be set equal to or larger than the width of the annular information storage surface 201 so that during polishing operation, the polishing pads 4 are placed in contact with the magnetic disc 200 with the information storage surface 201 thereof being located within the central bore 40 in each polishing pad 4.

Also, although in the above embodiment, the angle of intersection of streak patterns on the magnetic disc 200 is set to be in the range of from 20 degrees to 30 degrees, it is not necessarily limited to this range. It is a matter of course that streak patterns can be formed which have a desired angle of intersection optimal from the point of view of the magnetic property and the like.

That is, by suitably adjusting the rotational speeds of the first and second motors 5, 6, there can be obtained streak patterns having a desired angle of intersection θ1 in the range of from 0 to 90 degrees.

Further, although in the above embodiment, the direction of revolution of the polishing pads 4 is the same as the direction of self-rotation thereof, these directions can be opposite with respect to each other, thereby further improving efficiencies in the polishing process as well as in the streak-pattern forming process.

Moreover, although in the above embodiment, the apparatus is constructed such that the magnetic disc 200 having an entire surface comprised of an information storage surface alone is subjected to the polishing and streak-pattern forming processes, a magnetic disc can be used which has an entire annular surface comprising an annular information storage area in which information is to be written or stored and an annular information non-storage area, in which no information is to be written or stored and which is formed around the outer or inner periphery of the annular information storage area. In this case, the inner diameter R of each ring-shaped polishing pad 4 may be smaller than the width M of the entire annular surface of the magnetic disc 200 but must be equal to or greater than the annular information storage area.

Furthermore, although in the above embodiment, a disc on which streak patterns are formed is in the form of a magnetic disc 200, the present invention can of course be applied to various types of discs other than the magnetic disc.

As described in detail in the foregoing, according to the present invention, it is constructed such that ring-shaped polishing pads are caused to revolve around the center of a disc while rotating on their own axes, thereby forming streak patterns having a predetermined angle of intersection on the information storage surface of the disc. With this construction, fine streak patterns can be formed and at the same time the conventional exclusive polishing step can be omitted. As a result, there is provided the excellent advantage that the cost of production facilities as well as the cost of manufacture can be reduced. In addition to this, by adjusting the self-rotation speed of the ring-shaped polishing pads in an appropriate manner, the angle of intersection of streak patterns can be arbitrarily and precisely set, thus improving the finishing accuracy of the disc.

Further, by driving three ring-shaped polishing pads disposed in a rotational or radial symmetry to revolve around the center of a disc while rotating on their own axes, much finer streak patterns can be formed on the information storage surface of the disc so that properties such as a magnetic property and the like of the disc can be further enhanced.

Moreover, the disc streak pattern forming apparatus is constructed from relatively simple parts such as a revolving means in the form of a drum having a teethed portion formed on its outer periphery, a self-rotating means comprising a shaft member, a pad mounting member on which ring-shaped polishing pads are mounted, and gear wheels, a first motor for driving the revolving member to revolve around the center of a disc, and a second motor for driving the self-rotating means to rotate on its own axis. With this simple construction, it becomes possible to provide the streak pattern forming apparatus at relatively low cost.

What is claimed is:

1. A disc streak pattern forming method for use in polishing an annular disc having a storage surface, a radially outer periphery and a radially inner periphery, and a center, the method comprising the steps of:

providing a ring-shaped polishing means having a central axis and defining a central bore therein;

placing the ring-shaped polishing means in contact with the surface of said disc, with at least one portion of the surface disposed inside the central bore of said ring-shaped polishing means;

driving said ring-shaped polishing means to revolve about the center of said disc;

driving said ring-shaped polishing means to rotate around its central axis; and said ring-shaped polishing means comprising at least one ring-shaped polishing pad, with said at least one ring-shaped polishing pad being disposed in such a manner that the radially outer periphery and the radially inner periphery of said at least one portion of the surface of said disc are both disposed inside the central bore of said at least one ring-shaped polishing pad, whereby the surface of said disc is polished and provided with streak patterns by said ring-shaped polishing means.

2. The disc streak pattern forming method according to claim 1, wherein the surface of said disc is annular and has an annular band area with a radially outer periphery and a radially inner periphery defining a radial width therebetween, and the central bore of said ring-shaped polishing means has a diameter equal to or greater than the radial width of the annular band area of said ring-shaped polishing means.

3. A disc streak pattern forming apparatus for use in polishing an annular disc having a surface, a radially outer periphery and a radially inner periphery, and a center, the apparatus comprising:

ring-shaped polishing means having a central axis, a central bore and a working surface in contact with said disc;

a drive unit supporting thereon said ring-shaped polishing means in such a manner that at least a portion of the surface of said disc is disposed inside the central bore of said ring-shaped polishing means, said drive unit being operable to revolve said ring-shaped polishing means around the center of said disc and rotate said ring-shaped polishing means about its central axis while maintaining contact with the surface of said disc, thereby polishing the surface of said disc and forming streak patterns thereon; and said ring-shaped polishing means comprises at least one ring-shaped polishing pad, with said at least one ring-shaped polishing pad being disposed in such a manner that the radially outer periphery and the radially inner periphery of said at least one portion of the surface of said disc are both disposed inside the central bore of said at least one ring-shaped polishing pad.

4. The disc streak pattern forming apparatus according to claim 3, wherein said drive unit comprises:

revolving means having a center and capable of revolving around the center of said disc;

self-rotating means mounted on said revolving means for rotation relative thereto; and driving means for driving said revolving means to revolve around the center of said disc and for driving said self-rotating means to rotate said ring-shaped polishing means about its central axis while maintaining contact with the surface of said disc, so as to polish the surface of said disc and form streak patterns thereon.

5. The disc streak pattern forming apparatus according to claim 3 wherein the surface of said disc has an annular band area with a radially outer periphery and a radially inner periphery defining a radial width therebetween, and the central bore of said ring-shaped polishing means has a diameter equal to or greater than the radial width of the annular band area of said ring-shaped polishing means.

6. The disc streak forming apparatus according to claim 3 wherein said ring-shaped polishing means comprises a plurality of ring-shaped polishing pads disposed about the center of said disc in such a manner that the radially outer periphery and the radially inner periphery of said at least one portion of the surface of said disc are both disposed inside the central bore of each of said ring-shaped polishing pads.

7. The disc streak pattern forming apparatus according to claim 4, wherein said revolving means has a toothed portion formed on its outer periphery; and said self-rotating means comprises a shaft member rotatably supported on said revolving means, a mounting member mounted on one end of said shaft member and having one end extended from said revolving means, said ring-shaped polishing means attached to the extended end of said mounting member, and a driven gear wheel mounted on the other end of said shaft member; and said driving means comprises a first motor having a first drive gear wheel in meshing engagement with said toothed portion of said revolving means for driving said revolving means through the meshing engagement of said first drive gear wheel and said toothed portion, and a second motor having a second drive gear wheel in meshing engagement with said driven gear wheel of said self-rotating means for driving said self-rotating means through the meshing engagement of said second drive gear wheel and said driven gear wheel.

8. A disc streak pattern forming method for use in polishing an annular disc having a storage surface, a radially outer periphery and a radially inner periphery, and a center, the method comprising the steps of:

providing a ring-shaped polishing means having a central axis and defining a central bore therein, said ring-shaped polishing means comprising a plurality of ring-shaped polishing pads;

placing the ring-shaped polishing means in contact with the surface of said disc, with at least one portion of the surface disposed inside the central bore of said ring-shaped polishing means;

driving said ring-shaped polishing means to revolve about the center of said disc;

driving said ring-shaped polishing means to rotate around its central axis;

disposing said plurality of ring-shaped polishing pads about the center of said disc in such a manner that the radially outer periphery and the radially inner periphery of said at least one portion of the surface of said disc are both disposed inside the central bore of each of said ring-shaped polishing pads; and subjecting said respective ring-shaped polishing pads to said contacting revolving and self-rotating steps, whereby the surface of said disc is polished and provided with streak patterns by said ring-shaped polishing means.

* * * * *